Patented Nov. 25, 1930

1,783,046

UNITED STATES PATENT OFFICE

NILS ERIK LENANDER, OF TRONDHJEM, NORWAY, ASSIGNOR TO ORKLA GRUBE-AKTIEBOLAG, OF LOKKEN VERK, NEAR TRONDHJEM, NORWAY

PROCESS FOR THE SEPARATION OF COBALT AND IRON FROM SOLUTIONS RICH IN IRON AS OBTAINED BY LIXIVIATING ROASTED PYRITES

No Drawing. Application filed June 27, 1929, Serial No. 374,263, and in Germany July 26, 1926.

This invention has for its object a process of working solutions of the character obtained in copper extraction works by lixiviating the product obtained by chlorinating roasting of pyrites. Such solutions, besides copper, frequently contain also zinc and cobalt in sufficiently large proportions as to render the recovery of these metals economically profitable.

The copper is usually recovered in the form of "cementation copper" by precipitation by means of iron. By this operation considerable quantities of iron are introduced into the solution. To allow of recovering the other valuable metals, particularly zinc and cobalt in a sufficiently high degree of purity from this solution rich in iron, it is necessary first to remove the iron from the solution.

In order that the precipitation of iron shall take place without simultaneous precipitation of zinc and cobalt, the entire quantity of iron salts in the solution must be present in the form of ferric compounds. The ferrous compounds present must therefore first be oxidized to ferric compounds. Such oxidation may be brought about by treatment with zinc oxide and introduction of air. This method has, however, not proved satisfactory for treating solutions of the type above referred to, because it takes a long time, besides resulting only in an incomplete oxidation.

It has also been suggested that in solutions, containing besides chlorides and sulphates of copper, cobalt and nickel also small percentages of bivalent or trivalent iron, the bivalent iron be first oxidized by treatment with chlorine. The applicant has now found that in solutions containing besides a great percentage of iron only small percentages of cobalt, the oxidation by means of chlorine results in simultaneous oxidation of the entire cobalt or at least the substantial part of the same.

These drawbacks in the known oxidation methods are avoided by using as an oxidizing agent an alkali chlorate, preferably sodium chlorate. It has been found that hereby a selective oxidation of the iron compounds can be brought about, so that these are oxidized, but not the cobalt compounds.

*Example*—A solution was treated, in which sodium sulfate has been introduced by leaching an ore previously roasted in the presence of a sodium salt, which after the copper having been precipitated by means of scrap iron and after removal of the substantial proportion of contained sodium sulphate by cooling to about 0° C. were of about the following composition:

Fe—15 grams to the litre
Co—0.6 gram to the litre
Zn—100 grams to the litre
S—10 grams to the litre A batch of solution, for example 20 m.³ is taken and heated to about 60° C. To this batch is added 99 kg. of sodium chlorate (0.33 kg. to each kg. of iron). After about one hour, the iron has been oxidized. There is now added about 240 kg. of burnt lime, suspended in water. After about half an hour, the iron has become precipitated, and at the same time the sulphur contained in the solution has been precipitated partly as basic sulphate of iron and partly as gypsum. The resulting precipitate is filtered off, and the filtrate further treated to recover cobalt, zinc and it may be also other valuable constituents.

What I claim is:—

1. The process of recovering cobalt from solutions, containing besides cobalt also iron in the ferrous state, comprising the steps of subjecting the ferrous iron to the oxidizing action of an alkali metal chlorate, precipitating the ferric iron thus obtained and further treating the remaining solution to recover the cobalt contained therein.

2. The process which consists in subjecting pyrites to chlorinating roasting, removing copper from the solution by cementation, subjecting the solution to freezing, removing the crystallized sodium sulphate, adding an alkali metal chlorate to the solution to oxidize ferrous iron, precipitating the ferric iron thus obtained and subjecting the remaining solution to a further treatment to recover cobalt, zinc or other valuable metals contained therein.

In testimony whereof I have signed my name unto this specification.

NILS ERIK LENANDER.